(No Model.)
W. B. PAGE & B. HAUSHEER.
MILK HEATER.
No. 454,948. Patented June 30, 1891.
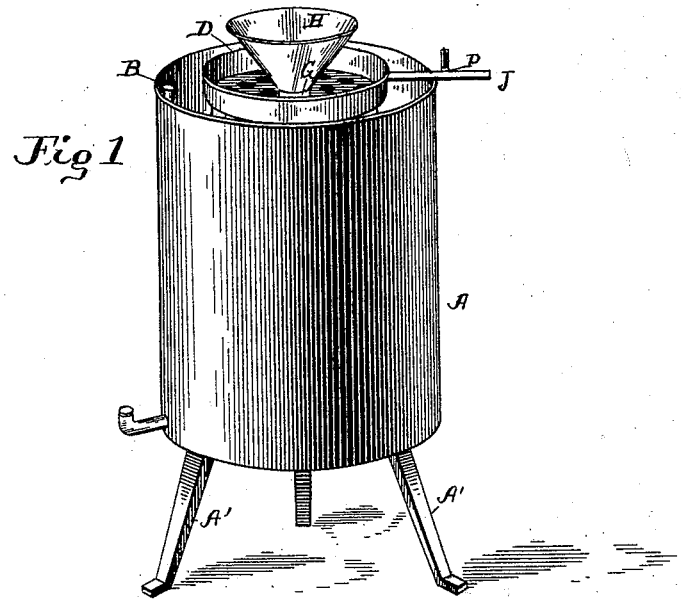
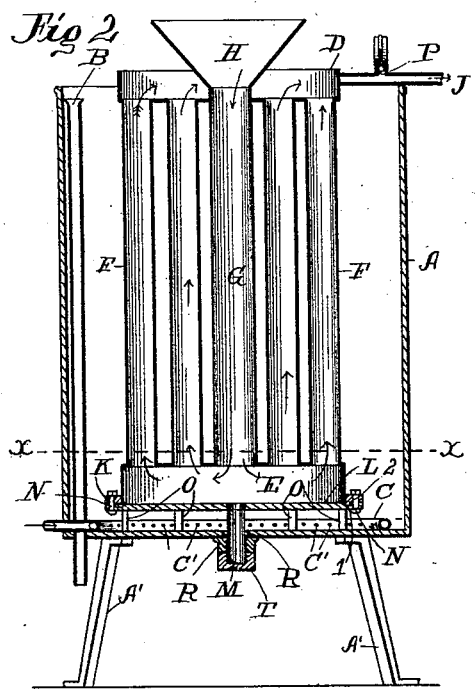
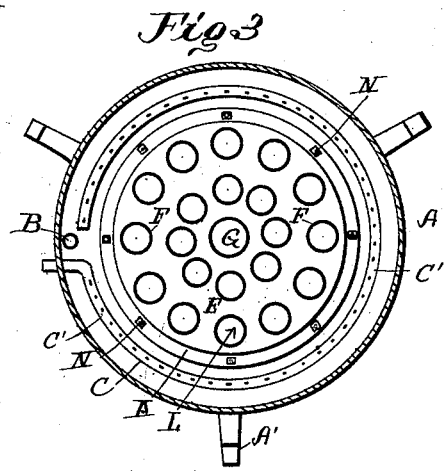
Witnesses
C. C. Burdine
J. B. Owens
Inventors
Wm. B. Page.
Bernhard Hausheer
by J. G. Manahan
their Attorney

UNITED STATES PATENT OFFICE.

WILLIAM B. PAGE AND BERNHARD HAUSHEER, OF DIXON, ILLINOIS.

MILK-HEATER.

SPECIFICATION forming part of Letters Patent No. 454,948, dated June 30, 1891.

Application filed March 28, 1891. Serial No. 386,802. (No model.)

*To all whom it may concern:*

Be it known that we, WILLIAM B. PAGE, a citizen of the United States, and BERNHARD HAUSHEER, a citizen of Switzerland, residing at Dixon, in the county of Lee and State of Illinois, have invented certain new and useful Improvements in Milk-Heaters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in milk-heaters, which are designed and adapted to heat the milk to a certain temperature during its continuous and uninterrupted passage through the machine.

It is well known to those conversant with the art of modern butter-making that the preferred method of obtaining the cream from the milk is by separating the two elements by the centrifugal action of a positive mechanical force as distinguished from the old mode of permitting the cream to rise during a lengthy period of quiescence. It is also well understood that it is essential to the procuring of the best quality of butter that the temperature of the milk be reduced as soon as possible after being drawn from the cow, so as to eliminate therefrom the animal heat. The low temperature thus produced is not conducive to the subsequent separation of the cream from the milk by centrifugal force, so that it becomes necessary to again raise the temperature of the milk by the extraneous application of heat to a certain degree just before passing it into the cream-extracting apparatus aforesaid. This has been accomplished heretofore by the direct application of heat from a fire or furnace to the cream-receptacle, and also by placing heating-pipes contiguous to the milk-vessels; but both of these methods are objectionable from the fact that the vessel containing the milk will inevitably become heated at certain localities where it is in contact with the furnace or heating-pipes aforesaid to such degree as to coagulate the albumen in the milk, which lies in contact with the inner surface of the milk-vessel at such location, and thereby create the small white specks so frequently seen in the best butter, where the above process has been adopted.

The purpose of our invention is to virtually suspend the milk-conduits within a secondary vessel containing water heated by steam-pipes discharging into the same to the desired temperature and to impart the desired temperature to the milk through the medium of the water aforesaid.

Our further object is to transmit this heat to the milk while the latter is constantly progressing through the machine, and thereby prevent any stagnation of the milk, which might be conducive to the coagulation of any portion of its albumen. To expose the milk *in transitu* as extensively as possible to the influence of the heat in the water, the circulation of the milk is through vertical tubes having intercommunication at their respective ends, and surrounded, respectively, by the heated water. The vertical position of the tubes is preferable as contrasted with the horizontal for the reason that with the vertical tubes the progress of the milk is through each and every one of the milk-tubes and equally and uniformly therein, while with the horizontal tubes the lower ones would be first filled, and perhaps the upper ones not at all.

We attain these objects by the mechanism illustrated in the accompanying drawings, in which—

Figure 1 is a perspective of a machine embodying our invention. Fig. 2 is a vertical section thereof. Fig. 3 is a cross-section thereof in the line $x\ x$ of Fig. 2.

Similar letters refer to similar parts throughout the several views.

A is a water-chamber supported upon legs A' or in any other suitable manner, having an open top through which water is primarily supplied to it.

B is a water-overflow pipe seated vertically within and adjacent to one side of the vessel A, having its upper end at an altitude to receive the water and discharge it as it rises to a point near the top of the vessel A and above the upper ends of the milk-tubes. The pipe B has its exit below the vessel A, and the excess water therefrom may be carried off in any suitable manner.

C is a steam-pipe projected within the water-vessel A near the lower end of the latter, and rests upon the bottom thereof in a coiled form, and has suitable steam-discharge openings C' in the portion thereof within the vessel A to permit the passage of the steam into the water contained in said vessel. The introduction of the steam within the body of water aforesaid tends to increase the volume of the latter, which makes the provision of overflow-pipe B essential.

D is a cup-form chamber having an open upper end, and E is a chamber of like character, but inverted. To the lower side of the chamber D and the upper side of the inverted chamber E is suitably attached a series of vertical milk-tubes F, having communication at their respective ends with the interior of the chambers D and E. A larger vertical milk-tube G is placed centrally within the series of smaller tubes F, and like them communicates at its lower end with the cup E, but is provided at its upper end with the funnel-shaped opening H, extending above the cup D. The cup D is further provided with the milk-outlet J at one side of its upper extremity. The lower surface of the cup E is attached to the external circular ring K and to the inner wall of said ring. The lower edges of the cup E are soldered or otherwise suitably fastened. A circular plate L, having a downwardly-extending central opening M, is seated removably against the lower surface of the ring K, and, in connection with said ring, when the opening M is closed, seals the lower surface of the cup E. The plate L is provided with an annular recess 1 on its upper surface and near its outer edge, and the plate K has a corresponding annular flange 2 on its lower surface adapted to enter the recess 1. The plates K and L are removably held in union by suitably-distributed vertical screws N, preferably inserted from below. Suitable packing is interposed between the opposing surfaces of the plates K and L to insure against the escape of the milk between such plates. Short legs O are formed on the lower surface of the plate L, which resting at their lower ends on the inner surface of the bottom of the vessel A serve to support the milk-circulating system within said vessel.

The milk is run through the milk-circulating mechanism as follows: It is delivered in a constant stream from any suitable supply into the hopper H, passes down the tube G into the chamber E, and from thence it rises uniformly through the tubes F into the upper chamber D, from whence it passes in a constant stream out through the milk-exit J, and through intervening tubes to the cream-separating machinery.

P is a short vertical tube inserted in and communicating with the outlet J, into which a thermometer can be optionally inserted to ascertain the temperature of the outflowing milk.

An opening R is formed centrally in the base of the vessel A, through which the central tube M, formed on the bottom of the plate L, is projected. The tube M is provided with peripheral threads, and by means of threaded bushing nut and cap T screwed thereon, the milk-circulating apparatus aforesaid is held firmly down upon the bottom of the vessel A and against lateral displacement in any direction. By means of the bushing S and cap T the opening R is optionally closed or opened to hold or withdraw the water within the vessel A. It is obvious that upon the withdrawal of the cap and bushing aforesaid the interior milk-circulating system can be lifted from and readily replaced within the vessel A.

The provision of the removable bottom L is essential to permit access to the tubes F at each end of the latter, so as to readily clean both the interior and exterior of such tubes, and when the plate L is removed by the withdrawal of the bolts N cleansing material, liquid or otherwise, can be readily passed through and between all of the milk-tubes. It is not only advantageous, but essential that the milk-conduits shall be absolutely clean.

The milk remaining in the devices after use can be drawn off through pipe M.

Our invention can be embodied in any desired size of apparatus; but inasmuch as the milk is heated while continuously moving the temperature can be imparted to a large amount thereof with a very moderately-sized machine. It will be observed that all of the milk-containing surfaces are exposed to contact with the water, and that at no point is any part of said surfaces in contact with a heated solid surface.

What we claim as our invention, and desire to secure by Letters Patent of the United States, is—

1. In combination with a water-reservoir A, the milk-chambers D and E, the series of vertical milk-tubes F, communicating at each end with said chambers, tube G, provided with hopper H, communicating with chamber E, and suitable outlet J, substantially as shown, and for the purpose described.

2. In a milk-heater, the combination of the upper chamber D and lower chamber E, inlet-tube communicating with the latter chamber from a point above the former one, tubes F, intermediate said chambers and communicating at their respective ends therewith, and a suitable milk-outlet J, attached to and communicating with said chamber D, substantially as shown, and for the purpose specified.

In testimony whereof we affix our signatures in presence of two witnesses.

WILLIAM B. PAGE.
BERNHARD HAUSHEER.

Witnesses:
ALBERT R. ASHLEY,
WILLIAM MCBRIDE.